(12) United States Patent
Pena

(10) Patent No.: US 6,170,856 B1
(45) Date of Patent: Jan. 9, 2001

(54) EXTENSION FOR TRAILER

(76) Inventor: Arthur C. Pena, R.R. 1 Box 110, Hurley, NM (US) 88043

( * ) Notice: Under 35 U.S.C. 154(b), the term of this patent shall be extended for 0 days.

(21) Appl. No.: 09/301,754

(22) Filed: Apr. 29, 1999

(51) Int. Cl.[7] ........................................ B62D 53/00
(52) U.S. Cl. .............. 280/656; 280/491.1; 280/789; 414/462; 414/480
(58) Field of Search ........................ 280/656, 504, 280/407, 495, 491.1, 789; 414/480, 460, 462, 481; 224/518, 521, 526, 498, 497; 296/37.1, 37.6; D12/101, 106

(56) References Cited

U.S. PATENT DOCUMENTS

| | | | |
|---|---|---|---|
| D. 418,451 | * | 1/2000 | Konecheck ........................ D12/101 |
| 3,722,948 | * | 3/1973 | Walsh ................................... 280/656 |
| 3,751,073 | * | 8/1973 | Alexander et al. ................. 280/482 |
| 4,128,258 | * | 12/1978 | Johnson .............................. 280/656 |
| 4,239,258 | * | 12/1980 | Burris .................................. 280/656 |
| 4,362,316 | * | 12/1982 | Wright ................................. 280/656 |
| 4,753,450 | * | 6/1988 | Wibben ............................... 280/789 |
| 4,772,038 | * | 9/1988 | MacDonald ........................ 280/401 |
| 5,553,762 | * | 9/1996 | Brown ................................. 414/462 |
| 5,769,449 | * | 6/1998 | Keesee ................................ 224/511 |

FOREIGN PATENT DOCUMENTS

| | | | |
|---|---|---|---|
| 0215049 | * | 10/1984 | (DE) ................................... 280/656 |
| 762853 | * | 1/1934 | (FR) .................................... 414/480 |

* cited by examiner

*Primary Examiner*—Anne Marie Boehler

(57) ABSTRACT

An extension for trailer for increasing the cargo-carrying capacity of a trailer. The extension for trailer includes a generally A-shaped frame with a pair of straight arm members oriented in a generally V-shaped configuration and a cross member extending between the arm members. Inner ends of the arm members is coupled to a bottom of a trailer. Outer ends of the arm members come together at a coupler. The coupler is adapted for mounting on a ball hitch of a towing vehicle.

1 Claim, 2 Drawing Sheets

EXTENSION FOR TRAILER

BACKGROUND OF THE INVENTION

1. Field of the Invention

The present invention relates to trailer attachments and more particularly pertains to a new extension for trailer for increasing the cargo-carrying capacity of a trailer.

2. Description of the Prior Art

The use of trailer attachments is known in the prior art. More specifically, trailer attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,563,596; U.S. Pat. No. 5,505,514; U.S. Pat. No. 4,420,182; U.S. Pat. No. 4,854,631; U.S. Pat. No. 3,325,206; and U.S. Pat. No. Des. 376,564.

While these devices fulfill their respective, particular objectives and requirements, the aforementioned patents do not disclose a new extension for trailer. The inventive device includes a generally A-shaped frame with a pair of straight arm members oriented in a generally V-shaped configuration and a cross member extending between the arm members. Inner ends of the arm members is coupled to a bottom of a trailer. Outer ends of the arm members come together at a coupler. The coupler is adapted for mounting on a ball hitch of a towing vehicle.

In these respects, the extension for trailer according to the present invention substantially departs from the conventional concepts and designs of the prior art, and in so doing provides an apparatus primarily developed for the purpose of increasing the cargo-carrying capacity of a trailer.

SUMMARY OF THE INVENTION

In view of the foregoing disadvantages inherent in the known types of trailer attachments now present in the prior art, the present invention provides a new extension for trailer construction wherein the same can be utilized for increasing the cargo-carrying capacity of a trailer.

The general purpose of the present invention, which will be described subsequently in greater detail, is to provide a new extension for trailer apparatus and method which has many of the advantages of the trailer attachments mentioned heretofore and many novel features that result in a new extension for trailer which is not anticipated, rendered obvious, suggested, or even implied by any of the prior art trailer attachments, either alone or in any combination thereof.

To attain this, the present invention generally comprises a generally A-shaped frame with a pair of straight arm members oriented in a generally V-shaped configuration and a cross member extending between the arm members. Inner ends of the arm members is coupled to a bottom of a trailer. Outer ends of the arm members come together at a coupler. The coupler is adapted for mounting on a ball hitch of a towing vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new extension for trailer apparatus and method which has many of the advantages of the trailer attachments mentioned heretofore and many novel features that result in a new extension for trailer which is not anticipated, rendered obvious, suggested, or even implied by any of the prior art trailer attachments, either alone or in any combination thereof.

It is another object of the present invention to provide a new extension for trailer which may be easily and efficiently manufactured and marketed.

It is a further object of the present invention to provide a new extension for trailer which is of a durable and reliable construction.

An even further object of the present invention is to provide a new extension for trailer which is susceptible of a low cost of manufacture with regard to both materials and labor, and which accordingly is then susceptible of low prices of sale to the consuming public, thereby making such extension for trailer economically available to the buying public.

Still yet another object of the present invention is to provide a new extension for trailer which provides in the apparatuses and methods of the prior art some of the advantages thereof, while simultaneously overcoming some of the disadvantages normally associated therewith.

Still another object of the present invention is to provide a new extension for trailer for increasing the cargo-carrying capacity of a trailer.

Yet another object of the present invention is to provide a new extension for trailer which includes a generally A-shaped frame with a pair of straight arm members oriented in a generally V-shaped configuration and a cross member extending between the arm members. Inner ends of the arm members is coupled to a bottom of a trailer. Outer ends of the arm members come together at a coupler. The coupler is adapted for mounting on a ball hitch of a towing vehicle.

Still yet another object of the present invention is to provide a new extension for trailer that can support an all terrain vehicle or extra camping supplies.

Even still another object of the present invention is to provide a new extension for trailer that could eliminate the need to drive a second vehicle along with extra supplies that won't fit in the first vehicle and trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
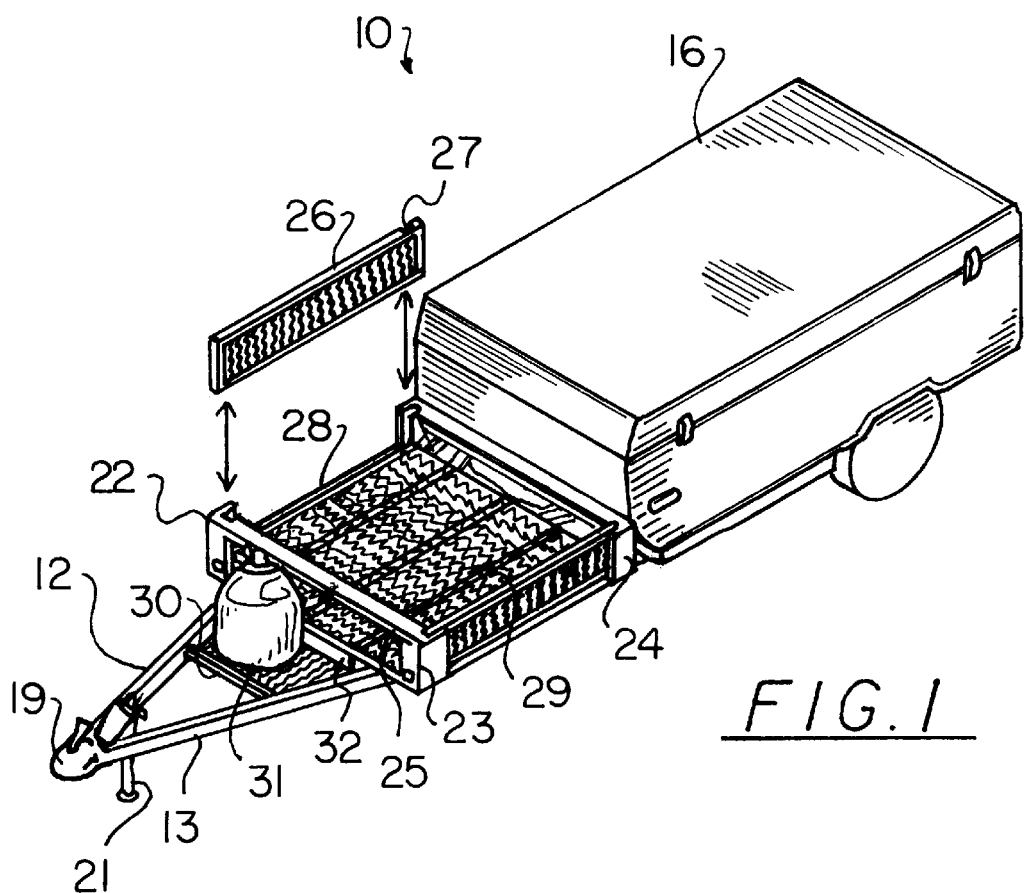
FIG. 1 is a schematic perspective view of a new extension for trailer according to the present invention.
Figure 2:
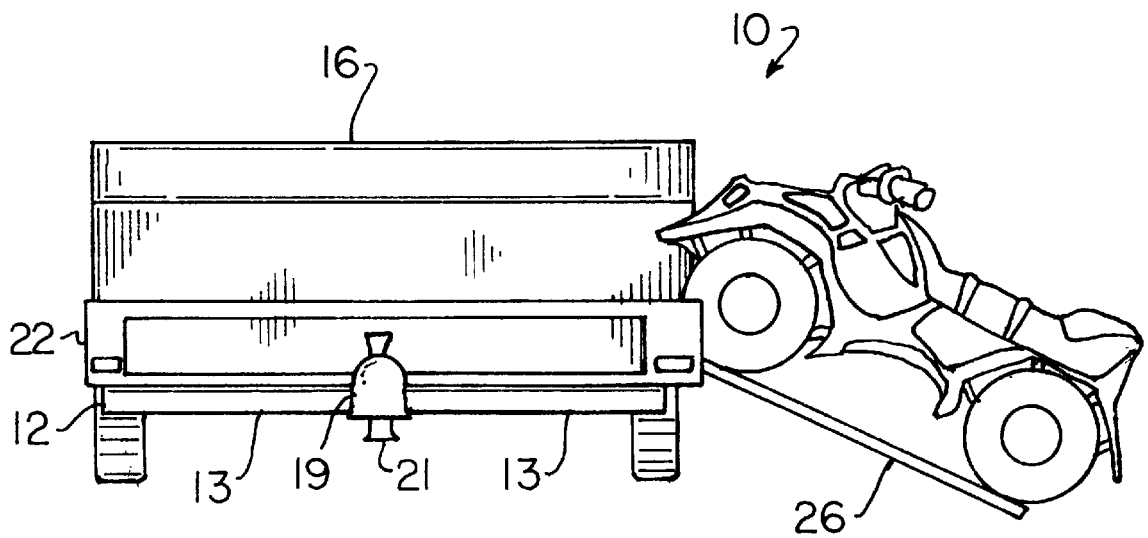
FIG. 2 is a schematic front view of the present invention.
Figure 3:
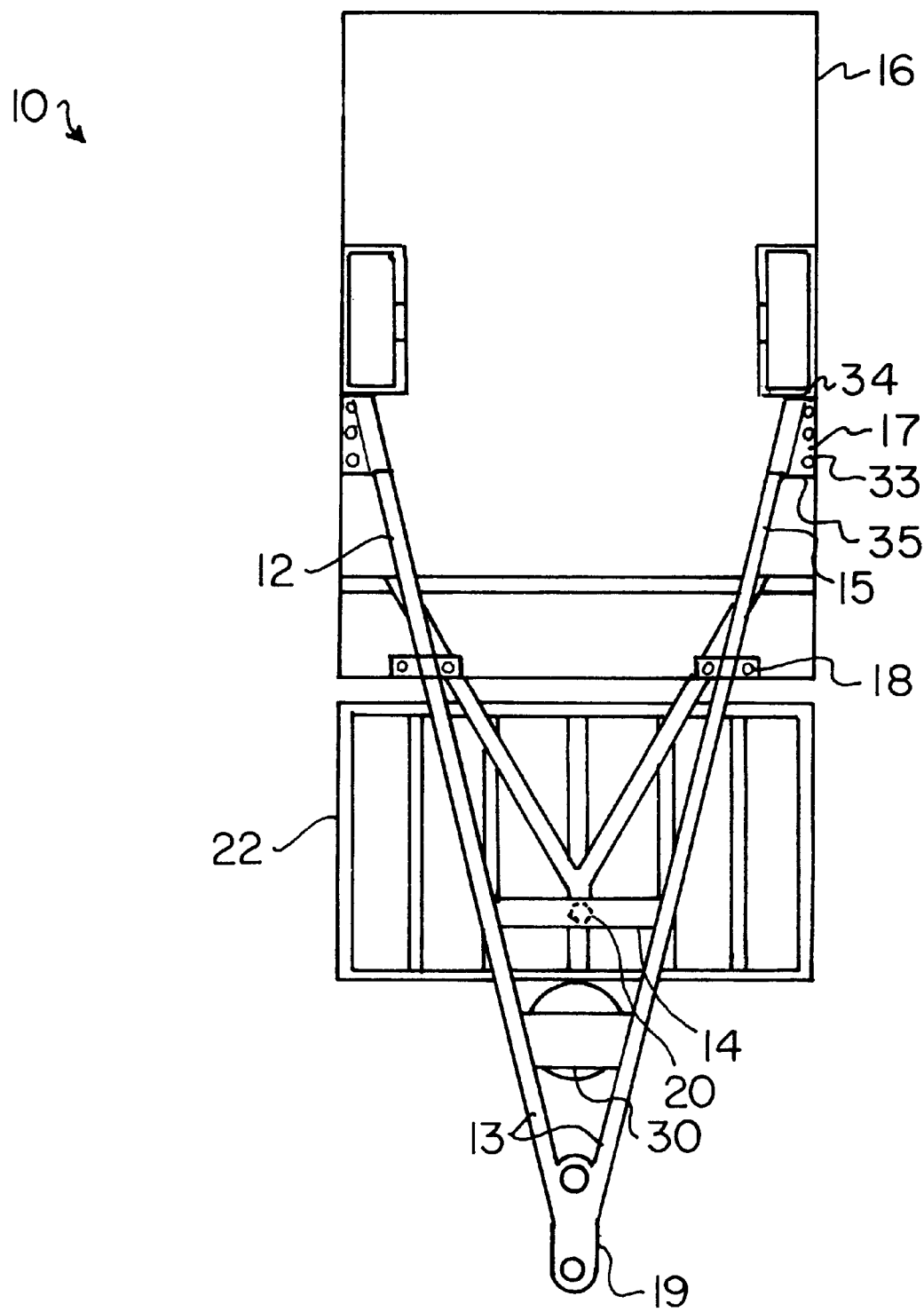
FIG. 3 is a schematic bottom view of the present invention.

With reference now to the drawings, and in particular to FIGS. 1 through 3 thereof, a new extension for trailer embodying the principles and concepts of the present invention and generally designated by the reference numeral 10 will be described.

As best illustrated in FIGS. 1 through 3, the extension for trailer 10 generally comprises a generally A-shaped frame 12 with a pair of straight arm members 13 oriented in a generally V-shaped configuration and a cross member 14 extending between the arm members. Inner ends 15 of the arm members are coupled to a bottom of a trailer 16 by a pair of center brackets 17 which are positioned in front of the wheels of the trailer. Ideally, a pair of front brackets 18 also couple the arm members to the front of the trailer. Outer ends of the arm members come together at a coupler 19. The coupler is adapted for mounting on a ball hitch of a towing vehicle.

An exemplary trailer to which the frame may be mounted is described in U.S. Pat. No. 3,325,206, which is herein incorporated by reference.

Preferably, the cross member is coupled to a hitch 20 of the trailer. This prevents bending of the arm members as well as ensures that the frame will not pull loose from the trailer.

Also preferably, the coupler has a support jack 21 coupled to it. The support jack is for supporting the coupler above a ground surface. Alternatively, the support jack could be pivotally coupled to an outer end of one of the arm members.

Preferably, a platform 22 is coupled to a top of the frame and is positioned between the coupler and the trailer. The platform should have a pair of forward and rearward walls 23,24 upwardly extending from front and rear edges thereof for keeping objects from sliding off of the front and back of the platform. Ideally, each of the forward and rearward walls of the platform has a horizontal opening 25 therein for reducing wind resistance against the wall.

Most preferably, a pair of side walls 26 extend between outer ends of the forward and rearward walls. The side walls are detachable from the forward and rearward walls. Ideally, each of the side walls has a notch 27 therein extending generally perpendicularly to the longitudinal axis of the side wall and which is adapted for engaging one of a pair of lateral lips 28 of the platform such that the side walls form a pair of ramps for driving ATV's onto the platform or sliding heavy objects onto the platform. See FIG. 2. Also ideally, a floor 29 of the platform is made of steel grating to allow water and wind to pass through it resting on or coupled to a plurality of support members. The support members should run front to back to minimize wind resistance.

Ideally, a second platform 30 extends between the arm members of the frame and is positioned between the coupler and the platform. The second platform may have a pair of forward and rearward walls 31,32 upwardly extending from front and rear edges thereof for keeping objects from sliding off of the front and back of the second platform. Most ideally, a floor of the second platform comprises steel grating to allow water and wind to pass through it. The second platform is especially suited to transporting propane tanks.

The preferred length of the frame between a line extending between the inner ends of the arm members and the coupler is about 12 feet 6 inches for a trailer dimensioned about 10 feet by 6 feet 6 inches. The inner ends of the arm members would extend across the forward 4 feet of the trailer's bottom and be coupled to the bottom of the trailer towards its outer sides.

The preferred dimensions for the platform is about 4 feet long between its forward and rearward sides by about 6 feet 6 inches wide between its lateral edges. The preferred distance between the platform and the coupler is about 3 feet.

Preferably, the center brackets each have a generally rectangular profile with one diagonally oriented side. The preferred length of the outer edge 33 of each inner bracket (positioned away from the arm member) is about 12 inches. The preferred lengths of the sides 34,35 extending perpendicularly to the outer edge are about 4 and 6 inches respectively. The front brackets should each be dimensioned about 2 inches by 12 inches. These dimensions provide the strength required to prevent detachment of the arm members from the trailer.

In use, the arm members are mounted to the bottom of the trailer with the center and inner brackets. The coupler is coupled to a hitch of a vehicle and the jack is raised. Objects are placed on the platforms and tied down if necessary. The trailer and extension are pulled to a destination where the jack may be lowered and the coupler detached from the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An extension device for mounting to a trailer having a pair of wheels and a hitch, said device comprising:

a generally A-shaped frame having a pair of arm members oriented in a generally V-shaped configuration and a cross member extending between said arm members, inner ends of said arm members being adapted for coupling to a trailer, outer ends of said arm members coming together at a coupler, said coupler being adapted for mounting on a hitch of a towing vehicle;

said cross member adapted for being coupled to a hitch of the trailer;

said coupler having a support jack coupled thereto, said support jack being for supporting said coupler above a ground surface;

a platform coupled to a top of said frame for being positioned between said coupler and the trailer;

said platform having a pair of forward and rearward walls upwardly extending from front and rear edges thereof;

wherein each of said forward and rearward walls of said platform has a horizontal opening therein for reducing wind resistance against said wall;

a pair of side walls extending between outer ends of said forward and rearward walls;

said side walls being detachable from said forward and rearward walls;

each of said side walls having a notch therein adapted for engaging a lateral lip of said platform such that said side walls form a pair of ramps;

a floor of said platform comprising a grating resting on a plurality of support members;

a second platform extending between said arm members of said frame and being positioned between said coupler and said platform;

said second platform having a pair of forward and rearward walls upwardly extending from front and rear edges thereof; and a floor of said second platform comprising a grating.

* * * * *